United States Patent [19]

Lancaster

[11] Patent Number: 4,735,229
[45] Date of Patent: Apr. 5, 1988

[54] WEAR MONITORING CONSTRUCTION FOR EROSIVE/CORROSIVE FLOW CONDUCTING DEVICES

[75] Inventor: Robert D. Lancaster, Bellaire, Tex.

[73] Assignee: Varco/Best Flow Products, Houston, Tex.

[21] Appl. No.: 45,891

[22] Filed: May 1, 1987

[51] Int. Cl.$^4$ .......................... F16L 7/00; G01M 3/08
[52] U.S. Cl. .................... 137/375; 137/312; 137/557; 251/363; 251/122; 166/91; 73/40.5 R
[58] Field of Search ............... 251/122, 363; 137/375, 137/312, 557; 166/91; 73/40.5 R; 277/2

[56] References Cited

U.S. PATENT DOCUMENTS

| | | | |
|---|---|---|---|
| 3,073,566 | 1/1963 | Bredtschneider | 251/363 |
| 3,132,867 | 5/1964 | Scaramucci | 277/2 |
| 3,187,775 | 6/1965 | Pinnell | 251/122 |
| 4,047,695 | 9/1977 | Cleveland et al. | 251/122 |
| 4,337,788 | 7/1982 | Seger | 251/360 |
| 4,377,177 | 3/1983 | Claycomb | 166/91 |
| 4,413,646 | 11/1983 | Platt et al. | 137/375 |
| 4,461,316 | 7/1984 | Cove et al. | 251/363 |
| 4,493,336 | 1/1985 | Renfro | 251/122 |
| 4,503,878 | 3/1985 | Taylor | 137/375 |

Primary Examiner—A. Michael Chambers
Attorney, Agent, or Firm—Pravel, Gambrell, Hewitt, Kimball & Krieger

[57] ABSTRACT

A wear monitoring device for use in a choke valve. The device includes a wear liner which fits in the flow annulus of the valve. The liner is sealed at either end from the fluid inlet valve and defines an annular void space in fluid communication with a port to the exterior of the valve. Leakage caused by flow cutting through the liner can be observed as fluid discharge from the port.

10 Claims, 3 Drawing Sheets

WEAR MONITORING CONSTRUCTION FOR EROSIVE/CORROSIVE FLOW CONDUCTING DEVICES

BACKGROUND OF THE INVENTION

The present invention relates to flow conducting and controlling devices and more particularly to an improved internal erosion and corrosion liner construction for such devices, and even more particularly to an improved wear monitoring liner construction for such devices wherein an intermediate longitudinally extended annular element is positioned in the bore to be monitored between the body and a wear liner so constructed that the liner can be extended even beyond an end connection and wherein the wear monitoring device rather than the body wears, erodes or corrodes away.

To simplify and yet clearly specify the function of the present invention, the discussion which follows is directed to an apparatus known as a choke valve. Choke valves are commonly used with oil and gas wells usually as part of an arrangement of valves and fittings that extend above the well head, commonly known in the industry as a "Christmas tree." While the discussion which follows is directed to an embodiment of the invention in a choke valve, it should be understood that the present invention in its broadest sense has applications to other types of valves and similar flowline devices. A Christmas tree normally includes an assembly of valves, tees, crosses, and other fittings including the choke valves at the well head. The assembly is used to control oil or gas well production and to give access to the well tubing. The choke valve is used to reduce the pressure of the fluid flowing from the well from a normally high pressure value to a lower pressure value. The pressure drop is accomplished in the choke valve by varying the cross-sectional area of the fluid flow stream to form a restriction for those fluids flowing from the well head.

The fluid stream flowing from an oil or gas well typically contains material which can be chemically corrosion and/or mechanically erosive to the choke valve. Thus, for example, the fluid stream can contain sand, and/or particulate material as well as acids and corrosive harmful chemicals. Chemical corrosion and mechanical erosion are problems which have long plagued choke valve constructions. To complicate the matters, many applications, such as oil and gas well installations are in remote locations wherein a daily inspection of the choke valve is difficult or impossible. In these situations undetected wear can create a valve failure situation which can be not only damaging to the choke valve but dangerous and possibly catastrophic. If the choke valve becomes eaten away because of corrosion or erosion, leakage of gas and/or oil could create a fire or explosion with damage to property and the environment as well as possible loss of life or personal injury.

In the past, various types of liners were used to protect choke valves from erosion and corrosion. The prior attempts, which did not provide satisfactory results, included such things as pistons, sleeves, cages, plating or linings of tungsten carbide, chrome stainless, Stellite and ceramics. In the past, the liner was placed directly upon the housing or body of the choke. In these prior configurations, when the wear sleeve or liner was fully eroded or corroded by the flowing media, damage to the choke valve body was immediate. This type of damage to the choke valve body required extensive repair which necessitated removal of the choke valve from the installation for repair at a machine shop or the like. Another problem with erosion and corrosion of choke valves was that associated with providing a valve liner which provided wear monitored length extending through the portion of the bore which is subject to wear and even beyond the connecting end portion of the choke valve body so as to minimize the chance that mechanical erosion or chemical corrosion could cause extensive damages to the choke valve body itself. Another problem with prior attempts to provide wear monitoring for choke valves was the alignment problem associated with the attachment of the liner to the bore of the flange or connecting portion. In the past, liners required a close tolerance fit so that if the parts were not machined within very tight tolerances, misalignment occurred.

Several choke valve constructions have been patented wherein a protection of the downstream portion of the valve body was of concern. For example, the Wolcott U.S. Pat. No. 4,638,833 entitled "Choke Valve" disclosed a flanged choke valve body having an exterior surface with a choke valve body interior defining a flow annulus that included upstream and downstream sections. The valve body was provided with internal erosion and corrosion trim liners and means for detecting for leaks in the liners. Seals were provided for isolating a port through which leakage can be observed exteriorly of the valve body. The Wolcott device used a cylindrical seal which was carried by the valve body itself so that if flow cut through the liner, immediate damage resulted to the valve body itself.

Various other patents illustrated the use of monitoring ports to detect leakage between seals in choke-type valves. The Renfrow U.S. Pat. No. 4,518,148 disclosed a port between a seal and a packing element wherein the port allowed liquids and gases to escape. The Renfrow U.S. Pat. No. 4,493,336 disclosed a leak-off port between seals for a hydraulic choking device used in controlling fluid flow from an oil or gas well. The Meek U.S. Pat. No. 4,469,122 disclosed a modular check valve having monitoring ports for minimizing the chance of fluid being forced into threaded areas of the valve and also for reducing the change of fluid pressure building up in the threaded region if the seals on the valve allow some leakage.

U.S. Pat. No. 4,136,709 disclosed a ball valve using liners disposed on either side of a ball valving member. Wear indicators were provided between the liners and the valve body to detect erosion in the liners and spacers. Leakage was monitored along the length of the liners which extended to the flanged face portions of the ball valve on one end and to a seal on the other end.

U.S. Pat. No. 4,413,646 disclosed a streamline coal slurry letdown valve. This patent disclosed liners extending beyond the flange face on the downstream portion of the valve wherein the valve seat and valve seat retainer were lined with erosion resistant material such as tungsten carbide. U.S. Pat. No. 4,503,878 disclosed a valve seat insert that included a sleeve with a blast tube secured within the sleeve. The blast tube was preferably made of a material such as tungsten carbide or silicon carbide which was resistant to the erosive action of high velocity fluid stream. A bore of the valve outlet was a continuation of the bore of the blast tube.

GENERAL DISCUSSION OF THE PRESENT INVENTION

The present invention solves the prior art problems and shortcomings in a simple, straightforward manner by providing an improved wear monitoring apparatus that includes a body having an an interior flow annulus that includes upstream and downstream bore sections. A flow restricting element such as an orifice, needle, cage or the like is positioned generally between the upstream and downstream flow bore sections for controlling flow within the annulus. An annular flow restricting element is removably mounted within the annulus and has a central longitudinal bore that coincides generally with the downstream bore section of the annulus. For ease of reference this flow restricting element will be referred to as a seat, although it should be understood that the present invention has applications to flow control devices in general.

A first port extends laterally through the valve body for communicating fluid flow between the annulus and the exterior surface of the body. First and second exterior seat seals positioned on opposite upstream and downstream sides of the port isolate a section of the annulus between the choke body and the seat, which isolated section communicates with the port to define a monitoring window. A longitudinally extending wear liner is removably mounted within the seat bore for monitoring erosion or corrosion within the seat bore. First and second liner seals are positioned at opposite end portions of the liner for providing a sealed annular void space of monitored length between the first and second liner seals that can collect and isolate fluid leakage caused by flow cutting through the liner. A second port extends laterally through the seat and in communication with the first port for transmitting flow between the first port and the sealed void space of monitored length so that leakage caused by flow cutting through the liner can be indicated at the valve exterior by observing the first port.

In one embodiment, the interior surface of the valve body and the seat include corresponding beveled surfaces which abut upon assembly. The first seat seal is preferably positioned at the corresponding beveled surfaces so that when the seat and body are assembled, a registration of the seat within the valve body perfects a seal when the beveled surfaces come together. The seat and body are arranged such that upon assembly positive axial alignment occurs. In this embodiment the positive axial alignment is provided by the interaction of the beveled faying surfaces but other constructions which provide such alignment might be used.

In the preferred embodiment, the seat bore is stepped, having first and second sections of differing internal diameter with the larger seat bore section defining an annular space adapted to receive the liner so that upon assembly the liner and the seat have a common cylindrical bore of uniform diameter. Because the seat carries the liner, the seat can extend the full length of the downstream bore section of the valve body to give wear monitoring protection to the valve body even beyond the flanged end of the body. Thus, the liner is spaced radially inwardly of the annulus and carried by the seat so that the liner can be increased in length without any modification to the valve body.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF A PREFERRED EMBODIMENT

Figure 1:
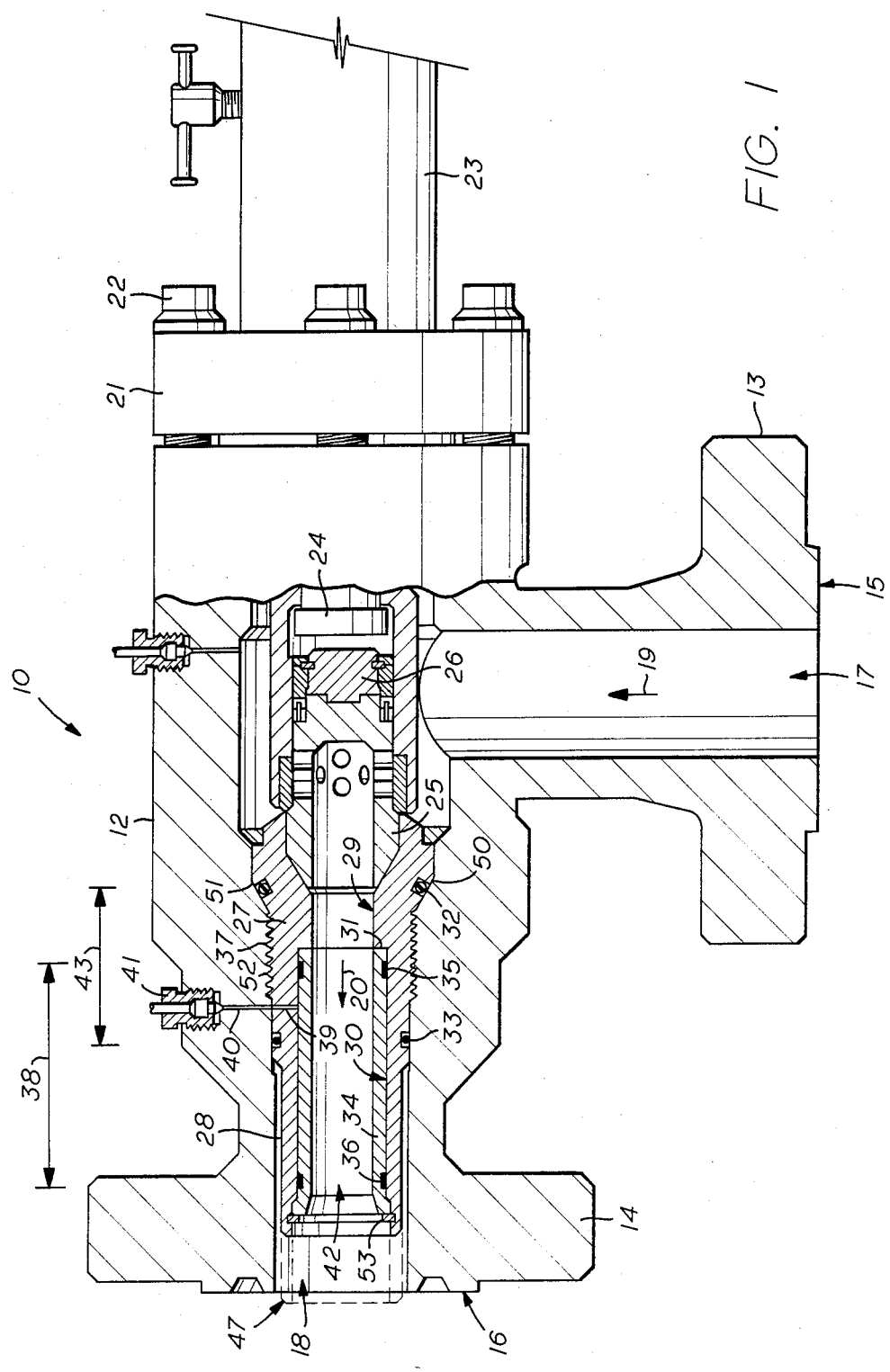
FIG. 1 is a partial sectional elevational view of the apparatus of the present invention.
Figure 2:
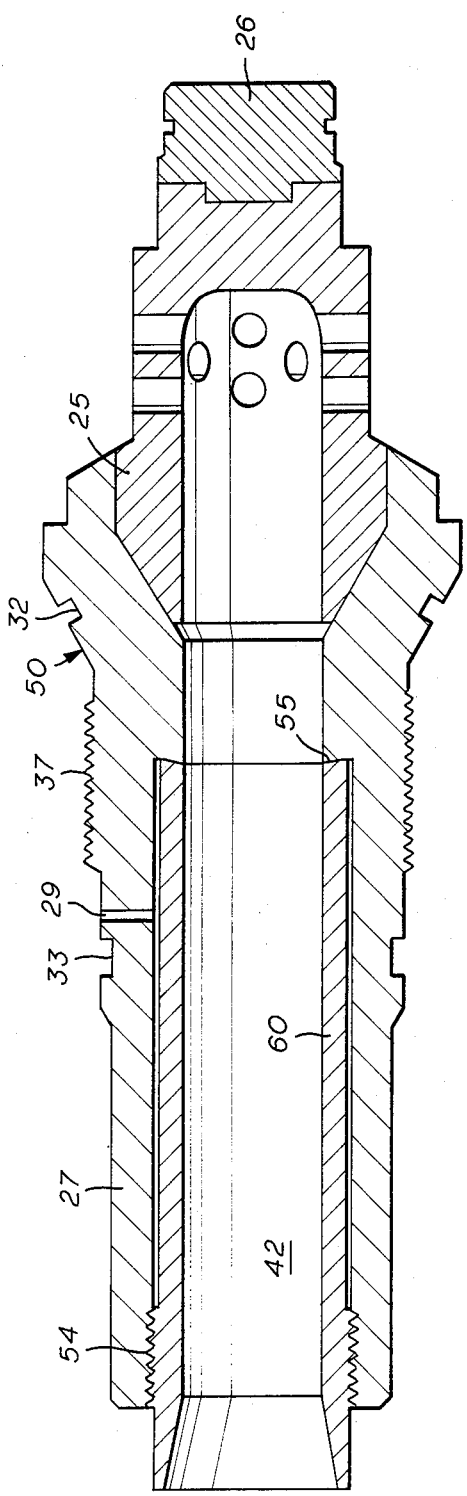
FIG. 2 is a longitudinal sectional view of an alternate embodiment of the apparatus of the present invention illustrating the seat, cage, and liner portions thereof.
Figure 3:
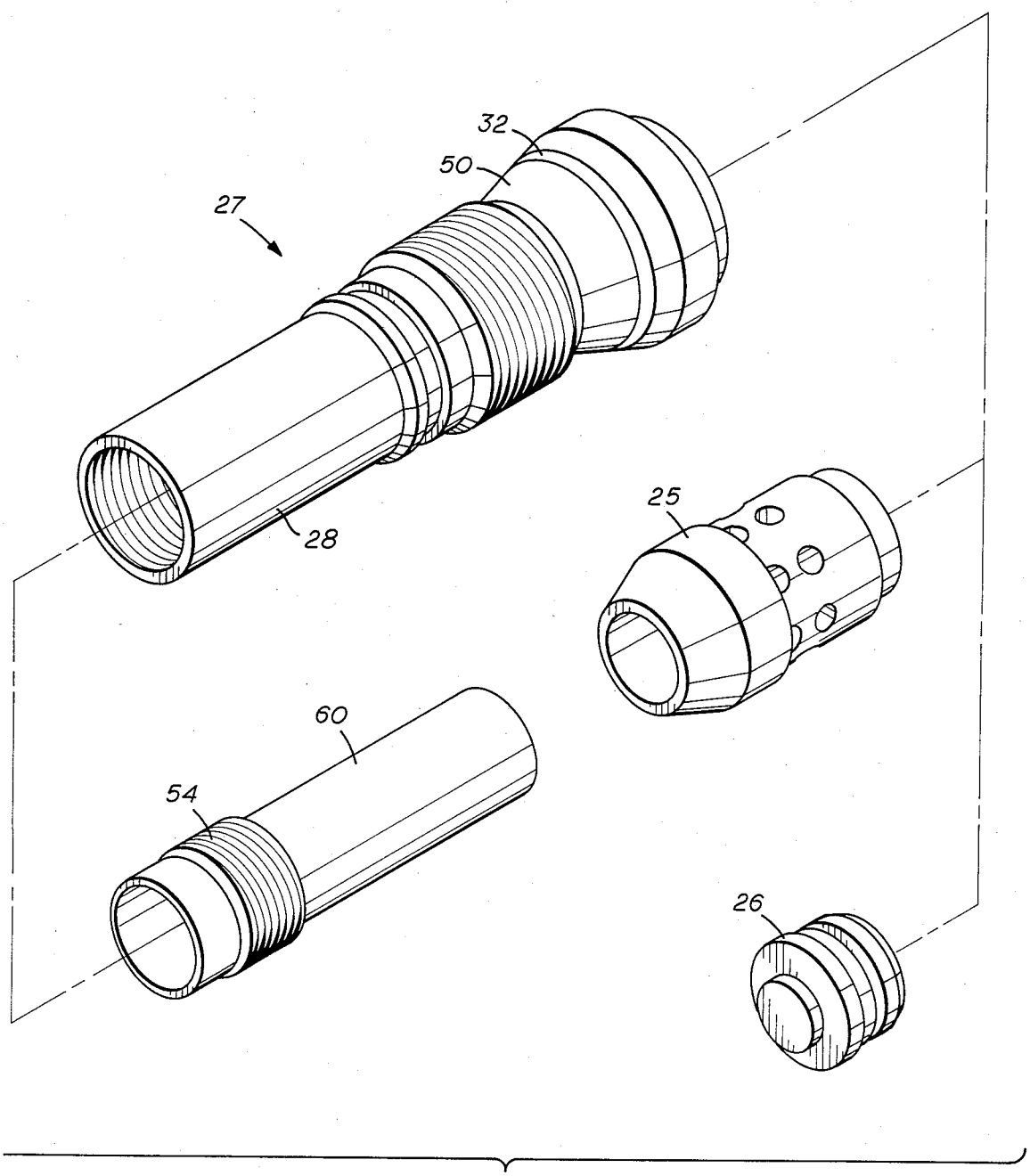
FIG. 3 is an exploded perspective view illustrating the seat, liner, cage and plug portions thereof.

FIGS. 1-3 show generally the preferred embodiment of the apparatus of the present invention designated generally by the numeral 10.

Choke valve 10 comprises a body 12 having an upstream flange 13 and a downstream flange 14. Each flange 13, 14 provides a flange face 15, 16 respectively which typically aligns with a similar flange of another valve, or of a spool piece, or other section of pipeline or such ancillary equipment as is commonly found at a well head or other valve assembly. The body 12 includes a flow annulus comprising an upstream bore 17 and a downstream bore 18 with flow arrows 19, 20 showing the direction of flow through valve body 12 beginning with the upstream flow arrow 19 and continuing to the downstream flow arrow 20. The downstream bore 18 normally has high velocity flow and is an area subject to erosion/corrosion.

The present invention provides an improved wear monitoring apparatus for use in flow conducting and controlling devices such as choke valves. A typical choke valve includes one or more restricting orifices formed generally between the upstream and downstream flow bore sections for throttling flow within the valve annulus. In FIG. 1 there can also be seen a bonnet flange 21, assembly bolts 22, a bonnet 23, stem 24, cage 25, and cap 26 all of which are conventional parts of a choke valve and form a means for restricting flow between the upstream and downstream bore sections 17, 18 of the apparatus 10.

The present invention provides an improved wear monitoring apparatus as part of an overall choke valve 10 which includes an annular seat body 27 having a seat exterior surface 28. Seat body 27 is generally tubular and is formed having a stepped central bore defined by interior annular surfaces 29 and 30. Annular surface 29 defines a first interior bore of smaller diameter than the second interior bore defined by annular surface 30. The seat interior surfaces 29, 30 intersect at annular shoulder 31. A pair of spaced apart annular seals 32, 33 are formed on the outer surface 28 of seat body 27. Upstream seat seal 32 and downstream seat seal 33 form a seal with body 12.

A removable liner 34, generally cylindrical in shape, is positioned within and carried by seat 27 abutting seat inner surface 30 of larger internal diameter. Liner 34 carries an upstream liner seal 35 and a downstream liner seal 36 which are positioned at the liner end portions respectively. Seals 34, 35 can be formed of any suitable seal material such as for example plastic, metal-to-metal, or the like. Seat 27 containing liner 34 is assembled to body 12 by any suitable means such as with a threaded connection 37.

Seat 27 includes a lateral port 39 which extends through seat 27 from inner-surface 30 to provide a fluid communication path through seat 27 from the annulus defined between the outer surface of liner 34 and inner surface 30 of seat 27. A laterally extending port 39 extends through seat 27. Body 12 includes another port 40 which extends laterally through body 12 and in alignment with port 39 as shown in FIG. 1. Port 40 can be equipped with a high pressure fitting 41 for opening or closing bore 40. Liner 34 includes a central longitudinal cylindrical bore 42 that preferably has an internal diameter which is uniform and which is of the same cross-sectional dimension as the cross-sectional dimension of the seat body bore at seat inner surface 29 as shown in FIG. 1. The liner seals 35, 36 are positioned at opposite end portions of the liner 34 and provide a sealed annular void space of monitored length 38 between the seals 35, 36 which space can collect and isolate fluid leakage caused by flow cutting through the liner 34 as can occur because of chemical corrosion or mechanical erosion. Because the ports 39, 40 are aligned, they are in communication with one another so that fluid entering the annular space between liner 34 and seat 27 and isolated by seals 35, 36 the leakage proceeds through ports 39 and 40 to the exterior surface of the valve body 12 by opening fitting 41.

Seat 27 may be formed having a bevelled annular surface 50 which corresponds to a bevelled annular surface 51 formed in body 12. The surfaces 50, 51 abut upon assembly of seat 27 with body 12. Annular seal 32 is positioned at the interface of surfaces 50, 51 so that as the threaded connection 37 is tightened, the annular seal 32 is compressed by surfaces 50, 51.

Liner 34 is secured within seat 27 by a retainer ring 53. Seat 27 is sealed downstream of port 39 at downstream annular seal 33. Thus, the seat 27 can extend the full length of the downstream bore 18 portion of the valve annulus, even beyond the downstream flange face 16 as represented by the seat end 47 shown in phantom lines. This feature allows corrosion/erosion protection for the housing in the vulnerable downstream bore 18 section for its full length, even to the downstream flange face 16.

FIGS. 2-3 illustrate an alternate construction of the removable seat and liner. In this alternative embodiment the seat 27a is connected to liner 60 at downstream threaded connection 54. The interior end portion 55 of liner 60 forms a metal-to-metal seal with seat 27. The remaining elements of this alternative embodiment function as the similarly numbered elements in the preferred embodiment described above.

The apparatus of the present invention may be manufactured of any suitable structural material depending generally upon its use. Parts may be made from common metals such as iron, steel, stainless steel, bronzes or the like or from "exotic" metals of any suitable type especially wear and corrosion resistant compositions. Under certain circumstances, dictated by service conditions, plastics, elastomers, monomers and polymers, and ceramics could be used.

The foregoing description of the invention is illustrative and explanatory thereof, and various changes in the size, shape and materials, as well as in the details of the illustrated construction may be made without departing from the spirit of the invention.

I claim:

1. A wear monitoring apparatus comprising:
   a. a body having an exterior surface;
   b. a body interior surface defining therewithin a flow annulus that comprises upstream and downstream bore sections;
   c. a means mounted within said flow annulus for controlling flow in the flow annulus;
   d. a seat means having a central longitudinal bore, said longitudinal bore coinciding generally with a portion of the bore section of the flow annulus, said seat means adapted to be received and removably mounted within the annulus;
   e. a first laterally extending port means through said body for providing fluid communication from the flow annulus through said body to the exterior surface of said body;
   f. first and second exterior seal means for isolating a section of the flow annulus between said body and said seat means that communicates with said first port means, said first exterior seal means being positioned upstream of said first port means, said second exterior seal means being positioned downstream of said first exterior seal means, said first and second exterior seal means and said first lateral port means thereby defining a monitoring window;
   g. a longitudinally extending liner removably mounted coaxially in the central bore of said seat means for monitoring wear;
   h. first and second liner seal means positioned at opposite end portions of said liner means for providing a sealed void space of monitored length between said first and second liner seal means that can collect and isolate fluid leakage caused by flow cutting through said liner means; and
   i. a second laterally extending port means extending through said seat means in communication with said first port means for transmitting flow between said first port means and the sealed void space of monitored length.

2. The apparatus of claim 1 wherein said body interior surface and said seat means include corresponding faying surfaces which abut upon assembly.

3. The apparatus of claim 2 wherein said first seal means is positioned at the corresponding faying surfaces.

4. The apparatus of claim 1 wherein the seat bore is stepped, having first and second sections of differing internal diameter.

5. The apparatus of claim 4 wherein one of the seat bore sections defines an annular space receptive of said liner means so that upon assembly the interior bore of said liner means and the smaller bore of said seat means form a common cylindrical bore of uniform diameter.

6. The apparatus of claim 1 wherein said seat means extends at its end portions beyond the liner means.

7. The apparatus of claim 1 wherein said body has a downstream connection and said seat means and said liner means extend beyond said connection.

8. The apparatus of claim 1 wherein said liner is spaced radially inwardly of the annulus and carried by said seat means so that said liner can be increased in length without modification to the body.

9. The apparatus of claim 1 wherein the upstream and downstream bore sections of said body are formed substantially in line with one another.

10. The apparatus of claim 1 wherein the upstream and downstream bore sections of said body are formed having longitudinal axes which intersect at an angle less than one hundred eighty degrees.

* * * * *